Figures 1, 2:
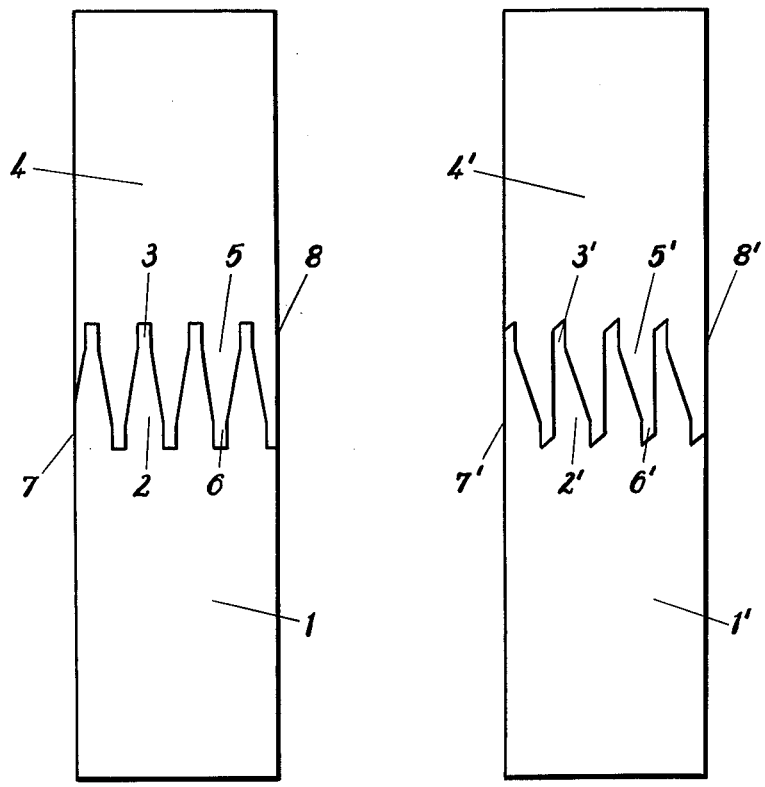

Sept. 7, 1965   W. HOFMANN   3,204,300
JOINT FOR WOODEN PARTS
Filed Nov. 28, 1960

INVENTOR
WILLI  HOFMANN
BY  Dicke, Craig & Freudenberg
ATTORNEYS 3,204,300
JOINT FOR WOODEN PARTS
Willi Hofmann, Turmstrasse 2, Muhlacker-Lomersheim,
Wurttemberg, Germany
Filed Nov. 28, 1960, Ser. No. 72,063
Claims priority, application Germany, Dec. 1, 1959,
H 38,024
5 Claims. (Cl. 20—92)

The present invention relates to a new type of joint for permanently securing wooden parts to each other or to parts of other materials, and especially for securing such parts in a longitudinal direction to each other, by providing at least one part with forwardly tapering projections which are inserted into corresponding recesses in the other part. The joint according to the invention is intended primarily for the production of door or window frames, furniture and the like.

For joining wooden parts to each other or to parts of other materials, it is important to provide the parts with gluing surfaces which extend substantially parallel to the wood fibers since only such surfaces will insure a long-lasting stability of the glued joint. Although the conventional tongue and groove joints possess such gluing surfaces which extend parallel to the wood fibers, these joints have the disadvantages that, if they are well fitting, it is very difficult to insert the two parts into each other, and that the glue will be wiped off the surfaces which are to be secured to each other by the tongues entering into the grooves.

In order to overcome these disadvantages it has already been proposed to provide one of the two parts to be joined with forwardly tapering, wedge-shaped projections which may be inserted into corresponding recesses in the other part. Although such a procedure will prevent the glue from being wiped off when the two parts are fitted into each other, it also incurs the great disadvantage that the inclined sides of the projections and recesses will necessarily intersect with the wood fibers and that especially the wedge-shaped projections and recesses themselves will no longer produce any mechanical solidity of the joint. In order to attain a permanent connection, such a joint therefore requires the two parts to remain in a press from the time when they are fitted together until the glue has completely hardened. It is therefore conventional to dry such joints in high-frequency gluing presses which, however, are too expensive for smaller workshops.

The principal objects of the present invention are to overcome the above-mentioned disadvantages of the known joints and to provide a joint which has a great mechanical solidity and in which the two parts may be easily fitted together, and in which there is no danger that the glue might be wiped off the adjacent surfaces of the two parts while they are being fitted together.

An essential feature of the invention for attaining these objects consists in providing the two parts to be joined with wedge-shaped projections and corresponding recesses and in providing the front ends of these projections with tongues which engage into corresponding grooves at the inner ends of the wedge-shaped recesses. A joint of such a design combines the advantages of a tongue-and-groove joint with those of a wedge-shaped connection. The wedge-shaped projections and corresponding recesses permit the parts to be easily fitted into each other, while the tongues which fit tightly into the grooves insure a good mechanical cohesion of the joint.

According to another feature of the invention, it is possible to make the wedge-shaped projections and recesses of a symmetrical shape. It is, however, also possible to design the wedge-shaped projections and corresponding recesses so that one side wall of each projection and recess extends parallel to the side wall of the parts to be joined or substantially parallel to the direction of the wood fibers in the two parts. One side wall of each wedge-shaped projection and recess may also be extended in a straight direction and such extension may form one side wall of the tongue or groove. This continuous side wall of the projection and tongue may preferably extend parallel to one side wall of the two parts to be joined.

Another feature of the invention consists in tapering the end surfaces of the tongues and the corresponding inner ends of the grooves toward one side. It is also especially advantageous if the projections and recesses on both parts which are to be joined are made of an identical shape.

For producing the projections and recesses as well as the tongues and grooves of the joints according to the invention, it is advisable to use an apparatus which is equipped with one or more cutting tools, for example, saws, milling cutters, or the like which have a cross-sectional shape in accordance with the shape of the projections or recesses. It is further advisable according to the invention to use a press which is provided with two relatively adjustable clamping fixtures into each of which one of the parts to be joined may be clamped and which may then be shifted relative to each other so that the two wooden parts may be tightly fitted into each other.

The objects, features, and advantages of the present invention will become further apparent from the following detailed description thereof, particularly when the same is read with reference to the accompanying drawings in which FIGURES 1 and 2 show plan views of two different embodiments of the invention.

In the first embodiment, as illustrated in FIGURE 1, the wooden part 1 is provided on its front end with wedge-shaped projections 2, the free ends of which are provided with tongues 3. Projections 2 are of a symmetrical shape and are adapted to engage into corresponding recesses in the other wooden part 4. The intermediate parts 5 and 6 between the recesses in part 1 also form projections, each of which consists of a wedge-shaped portion 5 which extends into a tongue 6. Projections 5, 6 also engage into the recesses which are formed between projections 2, 3 of part 1. Thus, both wooden parts 1 and 4 are provided with projections and recesses of identical shapes.

The above statements also apply to the modification of the invention as illustrated in FIGURE 2 in which the parts which are similar to those in FIGURE 1 are identified by the same numerals as in FIGURE 1 to each of which, however, an apostrophe is added. The difference between the two embodiments consists primarily in the fact that in the embodiment according to FIGURE 1 merely the side walls of tongues 3 and 6 and of the corresponding grooves extend parallel to the side walls 7 and 8 of parts 1 and 4 which are joined to each other in the longitudinal direction, while in the embodiment according to FIGURE 2 also one side wall of each wedge-shaped projection 2' and 5' which continues into one of the lateral walls of tongues 3' and 6' extends parallel to the side walls 7' and 8' of parts 1' and 4'. Furthermore, according to the embodiment as shown in FIGURE 2, the end walls of tongues 3' and 6' and the inner ends of the corresponding grooves are tapered toward one side.

By the provision of the tongues and grooves, both embodiments of the invention insure a perfect mechanical connection, while the wedge-shaped construction of the projections permits the two wooden parts to be easily fitted into each other even if the tongues and grooves fit very tightly into each other. The mechanical connection of the two parts to each other will become effective even before the parts are completely fitted into each other, that is, before the inclined sides of the projections and recesses are pressed against each other. Furthermore, due to the wedgelike shape of the projections, there is no danger that the glue will be wiped off the adjacent surfaces, and therefore a very solid and permanently glued joint will be attained. The solidity of the glued connection will be further improved in a joint as shown in FIGURE 1 by the fact that the side walls of the tongues and grooves extend parallel to the side walls 7 and 8 of the two wooden parts 1 and 4 and therefore also parallel to the wood fibers thereof, while in the joint according to FIGURE 2, even one side wall of each wedge-shaped projection extends parallel to the wood fibers. In a joint of the type as shown in FIGURE 2 it is also of a special advantage that, due to the tight fit of the tongues in the corresponding grooves, the surfaces of the wedge-shaped projections and recesses which extend parallel to the outer surfaces of the wooden parts will be tightly pressed against each other, whereas the seams between the inclined walls of the projections and recesses will be tightly closed in the same manner as in the conventional wedge-shaped joints, namely, not until the wooden parts are clamped under pressure against each other. In order to insure a perfect sealing of these seams, the grooves are preferably made of a depth which is slightly greater than the length of the tongues. By tapering the projections only toward one side according to the embodment of FIGURE 2, the further advantage will be attained that the inclined sides are inclined at a greater angle than those in symmetrical wedge-shaped projections and may therefore be made relatively short. Due to their own elasticity, they will then firmly engage with the adjacent part even though they extend into the outer surface of the workpiece. A joint of this type therefore does not require that the wooden parts be laterally compressed or that they be provided with outer projections of a greater thickness.

The projections and recesses of both joints according to FIGURES 1 and 2 may be very easily produced by suitable machinery, for example, by means of a form cutter.

The wooden parts which are provided with the projections and recesses according to the invention may be fitted into each other in the conventional manner by light taps, provided the end surfaces of the two parts opposite to the joint are straight. If, however, a long strip is to be made up of a plurality of individual pieces which are provided with such projections and recesses, the projections and recesses of the central pieces should be protected from any damage by such a tapping operation. In this case, it is advisable to use a press which is provided with two clamping fixtures which are adjustable relative to each other and into each of which one of the two parts which are to be joined may be clamped. By operating these clamping fixtures so as to move toward each other, the wooden parts may be fitted tightly into each other, so that the danger that they might be damaged by being hammered will be prevented. Although such a press is not illustrated in the drawings since the principles of its design will be evident to any person familiar with the art and also because it may be of many different types of construction, it also constitutes one of the features of the present invention.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A joint for securing wooden parts to each other or to parts of other materials, comprising two juxtaposed parts adapted to be secured together, one of said parts having at least one forwardly extending projection thereon including a free end and the other of said parts having at least one corresponding recess, said projections fitting tightly into said recesses, said projections and recesses being glued together with the side walls thereof forming the glued surfaces, each of said projections including a first portion adjacent the main body of said one part, each said first portion having a wedge-like shape and tapering inwardly in the direction of the free end of said projection, each of said projections and recesses having one side wall extending substantially parallel to one side wall of the parts to be secured to each other in the direction of said projections, each said free end comprising a tongue having essentially parallel sides and a relatively short length as compared to said first portion, each of said recesses including a portion having a wedge-like shape adjacent the end of said other part corresponding to said first portion of the respective projection and an inner portion having parallel sides and corresponding to said free end of the respective projection, whereby when said projections are inserted into said recesses, said free ends of said projections support the joint until setting of the glue and said glue is not wiped off the side walls of said wedge-like portions during insertion of the projections.

2. A joint for securing wooden parts to each other or to parts of other materials, comprising two juxtaposed parts adapted to be secured together, one of said parts having at least one forwardly extending projection thereon including a free end and the other of said parts having at least one corresponding recess, said projections fitting tightly into said recesses, said projections and recesses being glued together with the side walls thereof forming the glued surfaces, each of said projections extending in the direction of the wood fibers in the parts to be secured to each other and including a first portion adjacent the main body of said one part, each said first portion having a wedge-like shape and tapering inwardly in the direction of the free end of said projection, each of said projections and recesses having one side wall extending substantially parallel to said wood fibers in the parts to be secured to each other, each said free end comprising a tongue having essentially parallel sides and a relatively short length as compared to said first portion, each of said recesses including a portion having a wedge-like shape adjacent the end of said other part corresponding to said first portion of the respective projection and an inner portion having parallel sides and corresponding to said free end of the respective projection, whereby when said projections are inserted into said recesses, said free ends of said projections support the joint until setting of the glue and said glue is not wiped off the side wall of said wedge-like portions during insertion of the projections.

3. A joint for securing wooden parts to each other or to parts of other materials, comprising two juxtaposed parts adapted to be secured together, one of said parts having at least one forwardly extending projection thereon including a free end and the other of said parts having at least one corresponding recess, said projections fitting tightly into said recesses, said projections and recesses being glued together with the side walls thereof forming the glued surfaces, each of said projections including a first portion adjacent the main body of said one part, each said first portion having a wedge-like shape and tapering inwardly in the direction of the free end of said projection, said projections and recesses having one side wall extending substantially parallel to one side wall of the parts to be secured to each other in the direction of said projections and said side wall of each of said projections and recesses having a straight extension forming one side wall of said tongue or groove, respectively, each said free end comprising a tongue having essentially parallel sides and a relatively short length as compared to said first portion, each of said recesses including a portion having a wedge-like shape adjacent the end of said other part corresponding to said first portion of the respective projection and an inner portion having parallel sides and corresponding to said free end of said respective projection, whereby when said projections are inserted into said recesses, said free ends of said projections support the joint until setting of the glue and said glue is not wiped off the side walls of said wedge-like portions during insertion of the projections.

4. A joint for securing wooden parts to each other or to parts of other materials, comprising two juxtaposed parts adapted to be secured together, one of said parts having at least one forwardly extending projection thereon including a free end and the other of said parts having at least one corresponding recess, said projections fitting tightly into said recesses, said projections and recesses being glued together with the side walls thereof forming the glued surfaces, each of said projections including a first portion adjacent the main body of said one part, each said first portion having a wedge-like shape and tapering inwardly in the direction of the free end of said projection, each of said projections and recesses having one side wall extending substantially parallel to one side wall of the parts to be secured to each other, said side wall of each of said projections and recesses having a straight extension forming one side wall of said tongue or groove, respectively, said side wall of each projection and tongue, and said side wall of each corresponding recess and groove extending substantially parallel to the direction of the wood fibers in the two parts to be secured to each other, each said free end comprising a tongue having essentially parallel sides and a relatively short length as compared to said first portion, each of said recesses including a portion having a wedge-like shape adjacent the end of said other part corresponding to said first portion of the respective projection and an inner portion having parallel sides and corresponding to said free end of the respective projection, whereby when said projections are inserted into said recesses, said free ends of said projections support the joint until setting of the glue and said glue is not wiped off the side walls of said wedge-like portions during insertion of the projections.

5. A joint for securing wooden parts to each other or to parts of other materials, comprising two juxtaposed parts adapted to be secured together, one of said parts having at least one forwardly extending projection thereon including a free end and the other of said parts having at least one corresponding recess, said projections fitting tightly into said recesses, said projections and recesses being glued together with the side walls thereof forming the glued surfaces, each of said projections including a first portion adjacent the main body of said one part, each said first portion having a wedge-like shape and tapering inwardly in the direction of the free end of said projection, each of said projections and recesses having one side wall extending substantially parallel to one side wall of the parts to be secured to each other in the direction of said projections, each said free end comprising a tongue having essentially parallel sides and a relatively short length as compared to said first portion, the front end surface of each of said tongues and the corresponding inner end surface of each of said grooves being tapered toward one side, each of said recesses including a portion having a wedge-like shape adjacent the end of said other part corresponding to said first portion of the respective projection and an inner portion having parallel sides and corresponding to said free end of the respective projection, whereby when said projections are inserted into said recesses, said free ends of said projections support the joint until setting of the glue and said glue is not wiped off the side walls of said wedge-like portions during the insertion of the projections.

References Cited by the Examiner

UNITED STATES PATENTS

| | | | |
|---|---|---|---|
| 558,470 | 4/96 | Berkey | 20—92 |
| 1,403,958 | 1/22 | Holman | 144—300 |
| 2,082,431 | 1/37 | Tripp | 20—92 |
| 2,192,522 | 3/40 | Misuraca | 144—236 |

FOREIGN PATENTS

| | | |
|---|---|---|
| 291,794 | 1/29 | Great Britain. |
| 843,330 | 3/38 | France. |

JACOB L. NACKENOFF, *Primary Examiner.*

WILLIAM I. MUSHAKE, *Examiner.*